Sept. 6, 1938.  A. HOLLINGSWORTH  2,129,496

FINGERNAIL PROTECTOR FOR SWITCHBOARD OPERATORS

Filed Sept. 4, 1937

INVENTOR
Alice Hollingsworth
BY
ATTORNEY

Patented Sept. 6, 1938

2,129,496

UNITED STATES PATENT OFFICE 2,129,496

FINGERNAIL PROTECTOR FOR SWITCHBOARD OPERATORS

Alice Hollingsworth, New York, N. Y.

Application September 4, 1937, Serial No. 162,454

2 Claims. (Cl. 2—21)

This invention relates to new and useful improvements in a finger nail protector for switchboard operators.

The invention has for an object the construction of a protector which is characterized by the fact that it protects one's finger nails in a manner so that the opposite portion of the finger is exposed to permit feeling of objects.

More specifically, the invention contemplates characterizing the protector by an elastic sheath for engaging over the top of one's finger to about the first knuckle so as to completely encase the finger nail, and to form said sheath with an opening on the side opposite to said finger nail so as to expose the finger tip to permit feeling of objects through said opening.

Still further the invention proposes an arrangement whereby the elastic sheath may be shifted on the finger, and then the finger nail extended through an opening in the sheath so that the finger nail may be used to lift papers, or for other uses, as desired.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
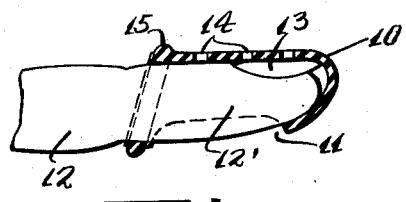
Fig. 1 is a longitudinal sectional view of a finger nail protector constructed according to this invention, and schematically shown engaged over one's finger.
Figure 3:
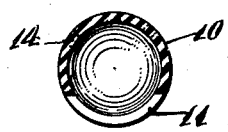
Fig. 3 is a transverse sectional view taken on the line 3—3 of Fig. 2.
Figure 2:
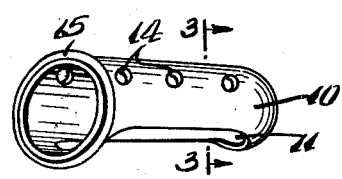
Fig. 2 is a perspective view of the finger nail protector.

The finger nail protector for switchboard operators, according to this invention, comprises an elastic sheath 10 for engaging over the tip of a finger to about the first knuckle to completely encase the finger nail, and said sheath being formed with an opening on the side opposite to the finger nail so as to expose the finger tip to permit feeling of objects through said opening 11. In Fig. 1 a finger 12 is schematically illustrated. This finger is provided with a finger nail 13 and it should be noted that the elastic sheath completely extends over and protects the nail. The tip portion 12' of the finger is exposed through the opening 11 to permit the finger to touch objects to feel same.

The elastic shield is formed with a plurality of vent openings 14 along its back side so that the air within does not become stagnant after some use. The rear end of the elastic sheath is formed with a thickened end portion 15 forming an elastic band by which the elastic sheath is firmly held on one's finger.

Figure 5:
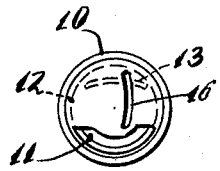
Fig. 5 is an end elevational view looking in the direction of the line 5—5 of Fig. 4.
Figure 4:
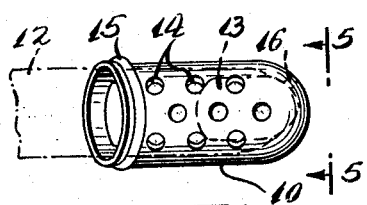
Fig. 4 is a plan view of a finger nail protector constructed according to a modification of this invention shown schematically applied to one's finger.
Figure 6:
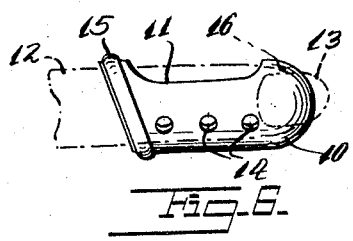
Fig. 6 is an elevational view similar to Fig. 4 but illustrating the elastic sheath shifted upon one's finger so that the finger nail is now projected from the sheath.

In Figs. 4–6 inclusive a modification of the invention has been disclosed in which the elastic sheath is so constructed that in a shifted position it is possible to extend the finger nail so that the nail may be used to lift papers or for other purposes. The finger nail protector in other respects is substantially identical in construction to that of the prior form and the same parts may be recognized by the identical reference numerals. It distinguishes in the provision of a slit 16 in the front thereof arranged at right angles to the bottom opening 11 and slightly off center.

Normally, the slit 16 is disposed at right angles to the finger nail 13 of the finger 12 which is illustrated in Fig. 5. When so worn the finger nail is fully protected. To extend the finger nail it is merely necessary that the sheath 10 be turned on one's finger to a position as shown in Fig. 6, then the nail 13 will extend out from the opening 16.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent, is:—

1. A finger nail protector particularly intended for switchboard operators, comprising an elastic sheath for engaging over the top end of one's fingers to about the first knuckle so as to completely encase one's finger nail, and said sheath being formed with an opening on the side opposed to said finger nail so as to expose the finger tip to permit feeling of objects through said opening, and said sheath being formed with a slit in its outer end transversely of said opening and normally transversely of one's finger nail, whereby the sheath may be turned on one's finger to a position in which the finger nail will extend through said slit.

2. A finger nail protector, comprising an elastic sheath for engaging over the end of one's finger so as to completely encase it to protect the finger nail against being accidentally broken, said sheath being formed with a side opening opposed to the side covering said finger nail so as to expose the finger tip to permit feeling of objects coming in contact with said finger tip, and said sheath being formed with an elongated slit arranged at right angles to said opening so that said sheath may be twisted on said finger to align said finger nail with said slit and then urge said sheath further on to said finger to cause said finger nail to protrude through said slit so that it may be used for picking up coins, sheets of paper, or like articles.

ALICE HOLLINGSWORTH.